United States Patent [19]

Katoh

[11] 4,298,640
[45] Nov. 3, 1981

[54] MOLDINGS FOR AUTOMOBILES

[75] Inventor: Hisanori Katoh, Tokyo, Japan

[73] Assignee: Inoue Gomu Kogyo Kabushiki Kaisha, Aichi, Japan

[21] Appl. No.: 109,067

[22] Filed: Jan. 2, 1980

Related U.S. Application Data

[63] Continuation-in-part of Ser. No. 944,307, Sep. 21, 1978, abandoned.

[30] Foreign Application Priority Data

Mar. 31, 1978 [JP] Japan .............................. 53-42502[U]

[51] Int. Cl.³ .......................... B32B 7/02; B32B 7/04; B60R 13/04; B61F 19/04
[52] U.S. Cl. ........................................... 428/31; 293/1; 293/126; 293/128; 428/122; 428/213; 428/215; 428/332; 428/412; 428/462; 428/463
[58] Field of Search .................. 428/31, 122, 412, 462, 428/463, 332, 213, 215; 293/1, 126, 128

[56] References Cited

U.S. PATENT DOCUMENTS

| | | | |
|---|---|---|---|
| 3,226,287 | 12/1965 | Shanok et al. | 428/31 |
| 3,440,129 | 4/1969 | Anselm | 428/31 |
| 3,471,979 | 10/1969 | Herr | 428/31 |
| 3,547,515 | 12/1970 | Shanok et al. | 428/31 |
| 3,547,516 | 12/1970 | Shanok et al. | 428/31 |
| 3,590,768 | 7/1971 | Shanok et al. | 428/31 |
| 3,616,099 | 10/1971 | Shanok et al. | 428/31 |
| 3,681,180 | 8/1972 | Kent | 428/31 |
| 3,687,794 | 8/1972 | Shanok et al. | 428/31 |
| 3,720,567 | 3/1973 | Shanok et al. | 428/379 |
| 3,777,438 | 12/1973 | Brown | 428/31 |
| 3,811,989 | 5/1974 | Hearn | 428/31 |
| 3,881,042 | 4/1975 | Ungerer | 428/31 |
| 3,914,482 | 10/1975 | Sawa et al. | 428/31 |
| 3,922,460 | 11/1975 | Jackson | 428/164 |
| 4,010,297 | 3/1977 | Wenrick | 428/31 |
| 4,139,664 | 2/1979 | Wenrick | 428/31 |
| 4,163,076 | 7/1979 | Katoh | 428/122 |
| 4,220,681 | 9/1980 | Narita | 428/31 |
| 4,223,052 | 9/1980 | Tsuda et al. | 428/31 |
| 4,245,450 | 1/1981 | Narita | 428/31 |
| 4,248,933 | 2/1981 | Katoh | 428/122 |

FOREIGN PATENT DOCUMENTS

929984 7/1973 Canada .................. 428/31

*Primary Examiner*—William J. Van Balen
*Attorney, Agent, or Firm*—Armstrong, Nikaido, Marmelstein & Kubovcik

[57] ABSTRACT

Integral formation of an elastic layer at the contact surface of a molding to a car body assures a reliable fitting of a molding to a car body avoiding the possibility of said molding becoming detached even though the fitting part of the car body is irregular in dimension and profile and prevents generation of noise from the fitted molding or damage of car body due to the fitting of a molding.

9 Claims, 7 Drawing Figures

MOLDINGS FOR AUTOMOBILES

This application is a continuation-in-part application of my copending application Ser. No. 944,307 filed Sept. 21, 1978, now abandoned.

BACKGROUND OF THE INVENTION

Recently the fringes on the roof, window, door fender, front grille, trunk, bonnet, etc. of a car and the side surface of a car body have been decorated with various moldings. Among others, a composite molding having a metallic lustre which has a stainless foil of light weight bonded on the surface of or embedded in, a heat-resistant hardened synthetic resin is popular. Such moldings are fitted or attached to specific sites of a car body. Practically, however, the car body surface, where a molding is provided, is irregular in dimension and profile with an uneven rise of plating, an uneven bending or a longitudinal waviness of the surface, while the molding itself is not free from dimensional variance in manufacture. Thus, installation of a molding often results in a partial or total misfit. In the case of a belt molding provided at a window or door, it is not wholly secured to the plating of a car body or window glass, though it makes contact with them. Such being the condition, therefore, various problems arise with the molding due to the vibration and shock of a running car, such as the molding being dislocated out of position, noise being generated at the interface between the molding and car body surface (including the glazed area), or the car body being damaged. Since the molding base is made of hardened synthetic resin such as ABS resin or polycarbonate resin for the sake of heat resistance, the molding is liable to damage the car body surface.

SUMMARY OF THE INVENTION

The present invention relates to a molding for automobiles.

The object of the present invention is to provide an auto-molding which assures a reliable fit to the car body, even if the latter is irregular in dimension and profile, absorbs the vibration of a car body, does not drop out of position, prevents generation of noise and protects the car body surface.

DETAILED DESCRIPTION OF THE INVENTION

Figure 1:
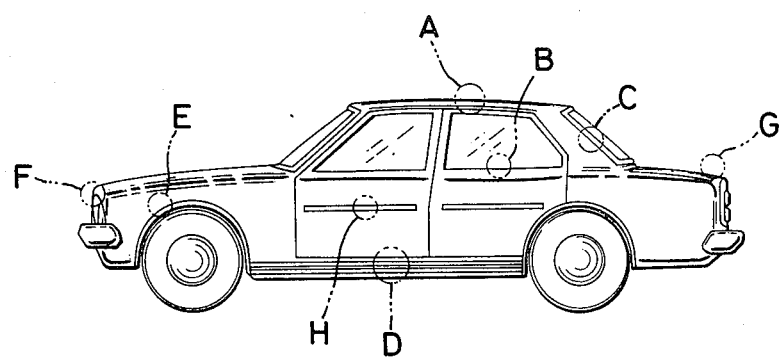
FIG. 1 shows the locations on a car body where a molding according to the present invention may be applied.
Figure 2:
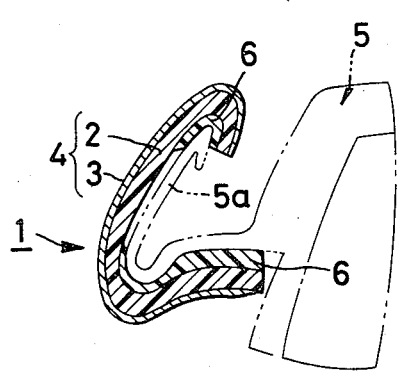
FIGS. 2 and 3 show sections of a roof drip molding as embodiments of the present invention.

In FIG. 1 showing the locations on car body where a synthetic resin molding according to the present invention is applied, A is a roof drip molding, B a door molding (belt molding), C a window molding, D a step molding, E a wheel arch molding, F a grille molding, G a trunk molding and H a side molding. As illustrated in FIG. 2 and so on, the body 4 of these moldings 1 consists of a synthetic resin base or substrate 2 and a stainless foil layer 3 integrated to the surface of said base 2 by, for example, bonding and an elastic layer 6 is partially or wholly integrated to the contact area of said body 4 of the molding with the car body 5 (including the glazed area).

As the synthetic resin to constitute the base or substrate 2, heat-resistant hardened synthetic resin such as ABS resin, acrylic resin or polycarbonate resin is commonly adopted, depending on the location on car body. The substrate 2 has a hardness of 85–95 on the Rockwell R Scale.

The thickness of the stainless foil layer 3 is in the range of from 50 to 200$\mu$. Depending on the case, the surface of said stainless foil layer 3 is coated with a thin film of clear synthetic resin, for example, vinyl chloride resin and cellulose acetate-butyrate resin.

The elastic layer 6 is desirably of a soft synthetic resin, for instance, soft vinyl chloride resin, vinyl acetate resin or ethylene-vinyl acetate copolymer resin. The elastic layer 6 has a hardness of 50–95 on the Shore A Scale. The thickness of the elastic layer 6 illustrated in FIG. 2 and so on is in the range of from 0.5 to 2 mm. Said elastic layer 6 can be simultaneously molded together with the body 4 of a molding by, for example, extrusion-coating, i.e., plastic extrusion molding.

The following are descriptions of different embodiments.

Figure 3:
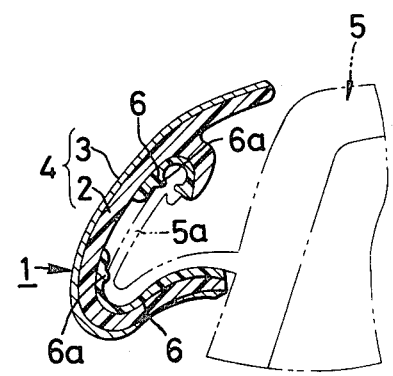

In FIGS. 2 and 3 showing a roof drip molding A, the roof edge 5a of car body 5 fits into the inner groove of a letter C shaped molding 1, wherein an elastic layer 6 is provided at the contact area with the roof edge 5a.

A projection 6a formed inside of said elastic layer 6 as illustrated in FIG. 3 would be desirable, for it would ensure the fitting. Meanwhile, separate provision of elastic layers 6 on the inside surface of two curved parts of the molding 1 to hold the roof edge 5a would make it possible to securely engage the roof edge 5a with a small area of the elastic layer 6.

Figure 4:
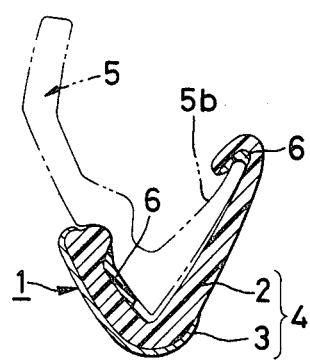
FIG. 4 shows a section of a wheel arch molding as an embodiment of the present invention.

In FIG. 4 showing a wheel arch molding E, a molding 1 having a V shaped section is attached to the plating 5b of the car body 5, wherein an elastic layer 6 is formed at the contact area of the molding with said plating 5b. Of course, it is possible to form said elastic layer 6 on the whole backside of said molding 1.

Figure 5:
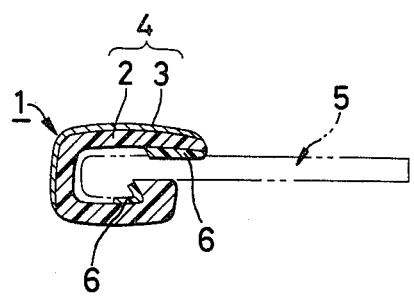
FIG. 5 shows a section of a trunk molding as an embodiment of the present invention.

FIG. 5 illustrates a trunk molding G and this figure also applies to a bonnet molding.

In the embodiments of FIGS. 4 and 5 as well as in those of FIGS. 2 and 3, separate elastic layers 6 are desirably formed on the inside surface of curved parts at both ends.

Figure 6:
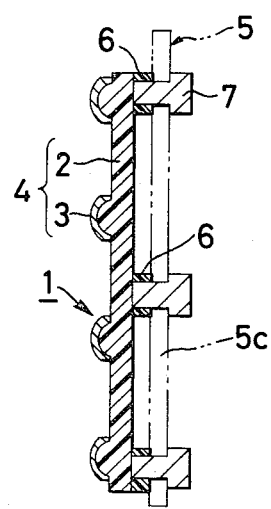
FIG. 6 shows a section of a step molding as an embodiment of the present invention.

In FIG. 6 illustrating a step molding D, the base or substrate 2 is approximately flat and a T-letter projection 7 fits into a hole bored on the plating surface 5c of a car body. Thereby, said elastic layer 6 is formed on the periphery of said projection 7. It is understood that the molding 1 (base 2) and the projection 7 are integrated. The front grille molding F and the side molding H are also of the same constitution as above.

Figure 7:
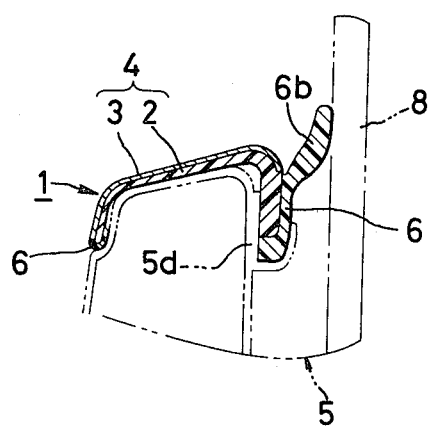
FIG. 7 shows a section of a door molding as an embodiment of the present invention.

FIG. 7 relates to a door molding B, in which the elastic layer 6 has a lip 6b formed to contact the window glass 8 which is opened and closed. Thus, the elastic layer 6 functions also as a sealing between the plating 5d of a car body 5 and the window glass 8.

As described above, in the synthetic resin molding of this invention, an elastic layer composed of a soft synthetic resin is provided at the contact area with the car body and, accordingly, said molding can make a perfect fit even when the car body surface is irregular in dimension and profile. Moreover, said elastic layer absorbs the vibration of a running car, thereby preventing a slackness or dropout of the molding, generation of noise and damage to the car body surface. Since the soft synthetic resin to constitute the elastic layer can be integrally molded with the molding body by extrusion-coating, the manufacturing process is extremely simplified.

What is claimed is:

1. A molding for automobiles, comprising a body consisting of a heat-resistant hardened synthetic resin base selected from the group consisting of ABS resin, acryl resin and polycarbonate resin having a hardness of 85–95 on the Rockwell R Scale, a stainless foil layer fixed to a first surface of said base, and an elastic layer, of a soft synthetic resin having a hardness of 50–95 on the Shore A Scale, formed on a second surface of said base at the contact area of said body with a car body, said second surface being on the opposite side of said base from said first surface wherein said soft synthetic resin is selected from the group consisting of soft vinyl chloride resin, vinyl acetate resin and ethylene-vinyl acetate copolymer resin.

2. The molding of claim 1, wherein said stainless foil layer has a thickness of from 50 to 200μ.

3. The molding of claim 1, wherein a projection is formed on said body where said elastic layer contacts a car body.

4. The molding of claim 1, wherein said elastic layer has a thickness of from 0.5 to 2 mm.

5. The molding of claim 1, wherein the molding body consisting of the base and the stainless foil layer has a C shape such that a portion of a car body can fit into the C and separate elastic layer portions are formed on the inside of the curved parts of the C at both ends of said molding body.

6. The molding of claim 1, wherein said base is flat, and wherein a projection, adapted for fitting into a hole of a car body, is integrally formed on the rear of said base and said elastic layer is provided on the periphery of said projection.

7. The molding of claim 1, wherein the molding is adapted to be attached to the plating of a car body around the window glass and the elastic layer of said molding extends as a lip to engage the window glass.

8. The molding of claim 1, wherein said base and said elastic layer are simultaneously molded by extrusion-coating.

9. The molding of claim 1, wherein the molding body consisting of the base and the stainless foil layer has a letter V shape such that a portion of a car body can fit into the V and separate elastic layer portions are integrally formed on the inside of the curved parts at both ends of said molding body.

* * * * *